US011620790B2

(12) United States Patent
Sethi et al.

(10) Patent No.: US 11,620,790 B2
(45) Date of Patent: Apr. 4, 2023

(54) GENERATING A 3D MODEL OF A FINGERTIP FOR VISUAL TOUCH DETECTION

(71) Applicant: Apple Inc., Cupertino, CA (US)

(72) Inventors: Rohit Sethi, Mountain View, CA (US); Lejing Wang, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/205,830

(22) Filed: Mar. 18, 2021

(65) Prior Publication Data

US 2021/0209840 A1 Jul. 8, 2021

Related U.S. Application Data

(63) Continuation of application No. 16/580,873, filed on Sep. 24, 2019, now Pat. No. 10,970,922.

(60) Provisional application No. 62/738,733, filed on Sep. 28, 2018.

(51) Int. Cl.
G06T 17/00 (2006.01)
G06T 15/20 (2011.01)
G06F 3/041 (2006.01)
G06F 3/01 (2006.01)
G06T 1/00 (2006.01)

(52) U.S. Cl.
CPC .............. *G06T 17/00* (2013.01); *G06F 3/011* (2013.01); *G06F 3/041* (2013.01); *G06T 1/0007* (2013.01); *G06T 15/205* (2013.01); *G06T 2200/04* (2013.01)

(58) Field of Classification Search
CPC ......... G06T 7/55; G06T 15/205; G06T 17/00; G06T 1/0007; G06T 2200/04; G06F 3/041; G06F 3/011
See application file for complete search history.

(56) References Cited

U.S. PATENT DOCUMENTS

| 8,279,168 | B2 | 10/2012 | Glomski |
| 9,619,105 | B1 | 4/2017 | Dal Mutto |
| 2012/0035934 | A1 | 2/2012 | Cunningham |
| 2012/0182396 | A1 | 7/2012 | Hu |
| 2013/0257748 | A1 | 10/2013 | Ambrus |
| 2014/0111423 | A1 | 4/2014 | Park |
| 2014/0184496 | A1 | 7/2014 | Gribetz |

(Continued)

OTHER PUBLICATIONS

Budhiraja, Rahul, "Interaction Techniques using Head Mounted Displays and Handheld Devices for Outdoor Augmented Reality," A thesis submitted in partial fulfillment of the requirements for the Degree of Master in Human Interface Technology University of Canterbury, 2013.

*Primary Examiner* — Christopher E Leiby

(74) *Attorney, Agent, or Firm* — Blank Rome LLP

(57) ABSTRACT

Generating a 3D model may include determining, based on sensor data from a touch sensor on a first device, a touch event, wherein the touch event comprises a touch on the first device by a touching object. Generating a 3D model may also include, in response to a touch event, obtaining a first image of the touching object by a first camera of the first device, and obtaining, from a second device, a second image of the touching object, wherein the first image of the touching object captures a first view of the touching object, and wherein the second image of the touching object captures a second view of the touching object. A model of the touching object is generated based on the first image and the second image.

20 Claims, 6 Drawing Sheets

(56) References Cited

U.S. PATENT DOCUMENTS

2017/0228869 A1 8/2017 Mullins
2019/0014262 A1 1/2019 Yamaguchi

GENERATING A 3D MODEL OF A FINGERTIP FOR VISUAL TOUCH DETECTION

BACKGROUND

This disclosure relates generally to the field of touch detection, and more specifically to the field of generating a 3D model of a fingertip for visual touch detection.

Today's electronic devices provide users with many ways to interact with the world around them. For example, users may interact with electronic devices using virtual or physical keyboards, mice, trackballs, joysticks, touch screens, and the like. One way that users often interact with digital information on their device is through a touch screen interface. Touch screen interfaces allow a user to interact with a display surface using a finger, stylus, or other object. A touch sensor recognizes the area touched and provides a response to a user.

With the rise of mixed reality environments, users often provide input by additional means in order to enable virtual objects to interact with real objects. As an example, a user may touch a real object in order to interact with the real object in a mixed reality manner. However, real objects often do not include touch sensors which are traditionally utilized to detect touch from a user.

SUMMARY

In one embodiment, a method for generating a 3D model. The method includes determining, based on sensor data from a touch sensor on a first device, a touch event, wherein the touch event comprises a touch on the first device by a touching object. The method also includes, in response to a touch event, obtaining a first image of the touching object by a first camera of the first device, and obtaining, from a second device, a second image of the touching object, wherein the first image of the touching object captures a first view of the touching object, and wherein the second image of the touching object captures a second view of the touching object. The method also includes causing a model of the touching object to be generated based on the first image and the second image.

In another embodiment, the method may be embodied in computer executable program code and stored in a non-transitory storage device. In yet another embodiment, the method may be implemented in an electronic device.

DETAILED DESCRIPTION

Figure 1:
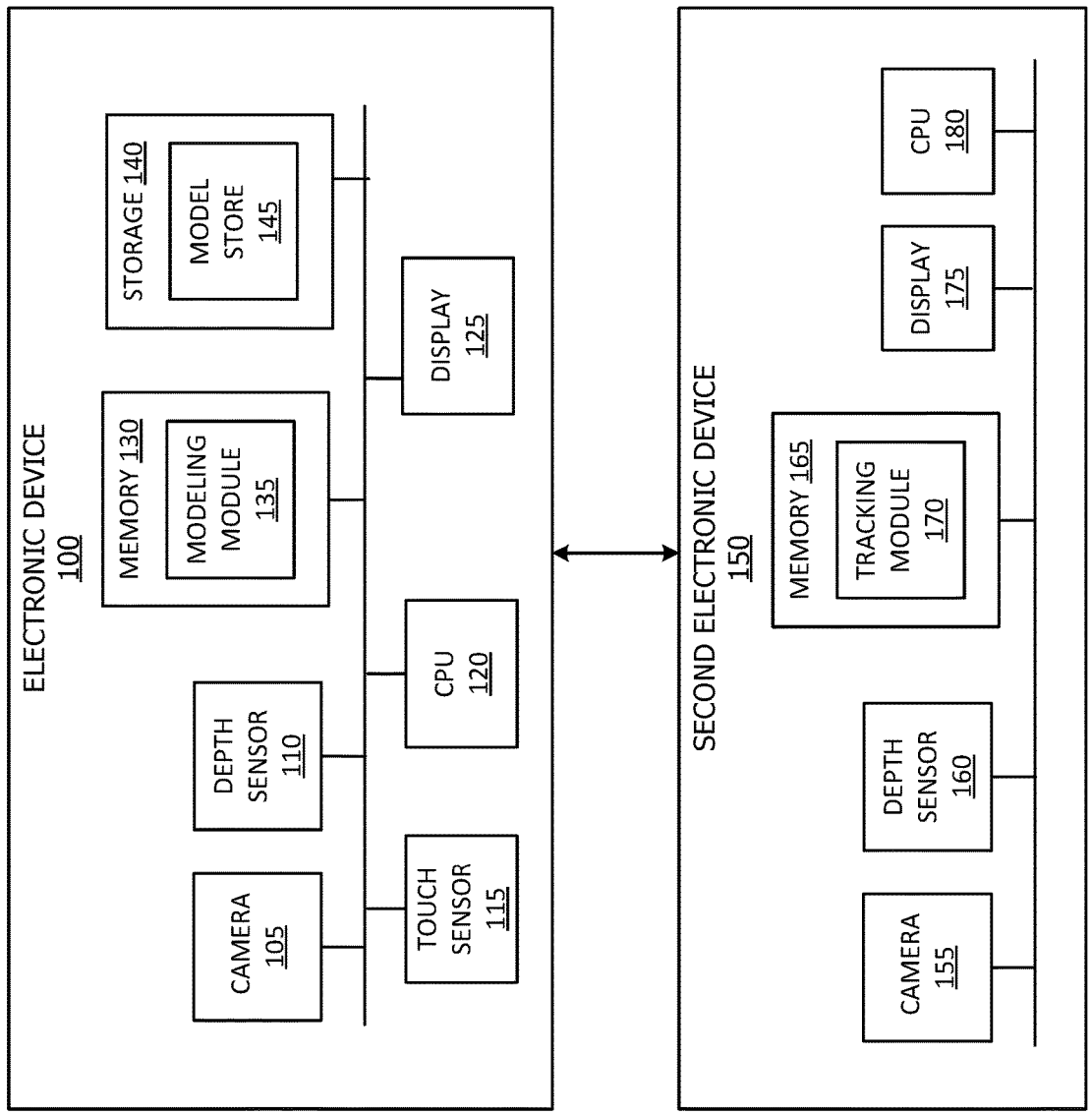
FIG. 1 shows, in block diagram form, a simplified system diagram according to one or more embodiments.

This disclosure is directed to systems, methods, and computer readable media for generating a 3D model of a fingertip for visual touch detection. In general, techniques are disclosed which utilize two electronic devices capturing images of a finger and/or a hand from different perspectives to generate the 3D model.

According to one or more embodiments, a touch event is detected on a first device that has a touch display or other touch interface, such as a tablet or a mobile phone. In response to the touch event, an image of the touching object may be captured by a front facing camera on the first device, and a second image of the touching object may be captured by a second camera on a second device from a different perspective than the first image. A 3D model of the touching object may be generated or modified based on the two images. In one or more embodiments, the 3D model may be utilized for vision-based touch detection. Further, in one or more embodiments, the 3D model of the fingertip may be used to assist in gesture detection or hand tracking.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed embodiments. In this context, it should be understood that references to numbered drawing elements without associated identifiers (e.g., 100) refer to all instances of the drawing element with identifiers (e.g., 100a and 100b). Further, as part of this description, some of this disclosure's drawings may be provided in the form of a flow diagram. The boxes in any particular flow diagram may be presented in a particular order. However, it should be understood that the particular flow of any flow diagram is used only to exemplify one embodiment. In other embodiments, any of the various components depicted in the flow diagram may be deleted, or the components may be performed in a different order, or even concurrently. In addition, other embodiments may include additional steps not depicted as part of the flow diagram. The language used in this disclosure has been principally selected for readability and instructional purposes, and may not have been selected to delineate or circumscribe the disclosed subject matter. Reference in this disclosure to "one embodiment" or to "an embodiment" means that a particular feature, structure, or characteristic described in connection with the embodiment is included in at least one embodiment, and multiple references to "one embodiment" or to "an embodiment" should not be understood as necessarily all referring to the same embodiment or to different embodiments.

It should be appreciated that in the development of any actual implementation (as in any development project), numerous decisions must be made to achieve the developers' specific goals (e.g., compliance with system and business-related constraints), and that these goals will vary from one implementation to another. It will also be appreciated that such development efforts might be complex and time consuming, but would nevertheless be a routine undertaking for those of ordinary skill in the art of image capture having the benefit of this disclosure.

For purposes of this disclosure, the term "camera" refers to one or more lens assemblies along with the one or more sensor elements and other circuitry utilized to capture an image. For purposes of this disclosure, the "camera" may include more than one camera system, such as a stereo camera system, multi-camera system, time-of-flight camera system, and may include a camera system that is capable of sensing the depth of the captured scene.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality. A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Referring to FIG. 1, a simplified block diagram of an electronic device 100 is depicted, communicably connected to a second electronic device 150, in accordance with one or more embodiments of the disclosure. Electronic device 100 may be part of a multifunctional device, such as a mobile phone, tablet computer, personal digital assistant, portable music/video player, wearable device, base station, laptop computer, desktop computer, network device, or any other electronic device. FIG. 1 shows, in block diagram form, an overall view of a system diagram capable of generating a 3D model of a touching object that may be used for visual touch detection. Electronic device 100 may be connected to second electronic device 150 across a network, a wired connection, a Bluetooth or other short range connection, among others. Second electronic device 150 may be a wearable device and may include, for example, a head mounted device which includes a camera or other sensors and which may communicate with the electronic device 100. In one or more embodiments, second electronic device 150 may not be a wearable device, and may be an electronic device with the capability of capturing touch images that indicate depth information in a physical environment and communicate with the electronic device 100. As such, second electronic device 150 may be any kind of electronic device, such as a mobile device or other computer, that has image capture capabilities and is communicably coupled to electronic device 100.

Electronic Device 100 may include processor, such as a central processing unit (CPU) 120. Processor 120 may be a system-on-chip such as those found in mobile devices and include one or more dedicated graphics processing units (GPUs). Further processor 120 may include multiple processors of the same or different type. Electronic Device 100 may also include a memory 130. Memory 130 may include one or more different types of memory, which may be used for performing device functions in conjunction with processor 120. For example, memory 130 may include cache, ROM, RAM, or any kind of transitory or non-transitory computer readable storage medium capable of storing computer readable code. Memory 130 may store various programming modules for execution by processor 120, including modeling module 135. Electronic device 100 may also include storage 140. Storage 140 may include one more non-transitory computer-readable storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Storage 130 may include a model store 145.

Electronic device 100 may also include one or more types of sensors. As depicted, electronic device 100 may include one or more cameras 105 along other sensors, such as depth sensor 110, from which depth of a scene may be determined. In one or more embodiments, each of the one or more cameras 105 may be a traditional RGB camera, or a depth camera. Further, cameras 105 may include a stereo- or other multi-camera system, a time-of-flight camera system, or the like which capture images from which depth information of a scene may be determined. Moreover, depth sensors 110 may include ultrasonic or other technology that utilizes sound waves and the like to detect depth. Electronic device 100 may include a touch sensor 115. Touch sensor 115 may detect when a user is interacting with the electronic device 100, and may be any kind of touch-sensitive sensor, such as a capacitive sensor, a surface acoustic wave sensor, a resistive sensor, and the like. In one or more embodiments, touch sensor 115 may be part of display 125, which may be, for example, a touch screen. Further, display 125 may utilize digital light projection, OLEDs, LEDs, uLEDs, liquid crystal on silicon, laser scanning light source, or any combination of these technologies.

Second electronic device 150 may be an electronic device with components similar to those described above with respect to electronic device 100. Second electronic device 150 may be any kind of electronic device (e.g., wearable or non-wearable) that includes one or more cameras 155 or other sensors, such as depth sensor 160, from which depth of a scene may be determined. In one or more embodiments, each of the one or more cameras 155 may be a traditional RGB camera, or a depth camera. Further, cameras 155 may include a stereo- or other multi-camera system, a time-of-flight camera system, or the like which capture images from which depth information of a scene may be determined. Further, depth sensors 160 may include ultrasonic or other technology that utilizes sound waves and the like to detect depth. Second electronic device 150 may include a memory 165 containing computer executable instructions, such as tracking module 170, which are executable by a processor, such as CPU 180. Memory 165 may include cache, ROM, RAM, or any kind of transitory or non-transitory computer readable storage medium capable of storing computer readable code. CPU 180 may be a system-on-chip such as those found in mobile devices and include one or more dedicated graphics processing units (GPUs). Further CPU 120 may include multiple processors of the same or different type. Tracking module 170 may obtain 3D models of touching objects, such as those in model store 145, and utilize the 3D models for vision-based touch detection. For example, tracking module 170 may detect touch by a touching object in a physical environment without the use of touch sensor 115 (e.g., touch of an object that is not associated with the touch sensor 115). In one or more embodiments, an accurate 3D model may be utilized for vision-based touch detection when the touching portion of the finger (e.g., the touching object) is occluded from the perspective of the sensors utilized for vision-based touch detection. Further, in one or more embodiments, tracking module 170 may utilize the 3D model of the touching object for other techniques, such as object identification or gesture tracking. In one or more embodiments, the 3D model may be generated in the form of a point cloud or a 3D mesh representation. In one or more embodiments, a point cloud for the model may be generated from a 3D model or a 3D mesh representation from any perspective viewpoint. The touching object may be, for example, an appendage of a user, such as a finger or fingertip of the user. A fingertip may be considered any portion of a finger, such as a pad of the finger, a portion of the finger from the fingertip to the first knuckle, a portion of the finger from the fingertip to the second knuckle, and the like.

Second electronic device 150 may allow a user to interact with CGR environments. There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment.

Rather than an opaque display, a head mounted system may have a transparent or translucent display. The transparent or translucent display may have a medium through which light representative of images is directed to a person's eyes. The display 175 may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In one or more embodiments, the modeling module 135 may manage models of touching objects. For example, the modeling module 135 may manage models of touching objects, such as fingers, in model store 145. The modeling module 135 may register fingers or other touching objects used to interact with a physical environment. In one or more embodiments, a user may initiate use of a particular touching object in a number of ways, such as signing into a user account associated with the touching object, or utilizing object detection to determine a particular touching object is in use. For example, a user may spin a finger in front of a camera, such as camera 105 of the electronic device 100, or camera 155 of the second electronic device 150, such that the modeling module 135, or the tracking module 170 of the second electronic device 150, may begin using the modeling techniques based on a model of the particular recognized finger. As an example, an initial model of the particular recognized finger may be obtained from the model store 145 and utilized for the various techniques described herein.

The modeling module 135 may generate a mode of a touching object (e.g., a tip or end of a finger) based on depth information captured from the electronic device 100 and the second electronic device 150. In one or more embodiments, the depth information captured from the electronic device 100 and/or the second electronic device 150 may be utilized to modify a preexisting model of a particular touching object which may be stored in the model store 145. According to one or more embodiments, the 3D model of the touching object, having been refined based on the touch image or other depth data, may then be used for more accurate vision-based touch detection and other tracking by the electronic device 100 and/or the second electronic device 150.

Although electronic device 100 is depicted as comprising the numerous components described above, in one or more embodiments, the various components may be distributed across multiple devices. Particularly, in one or more embodiments, one or more of the tracking module 170, modeling module 135, and model store 145 may be distributed differently across the electronic device 100 and second electronic device 150. Further, the various components and functionality may be distributed among other devices not described, such as base stations or additional computing devices communicably connected to the electronic device 100 and/or the second electronic device 150. Accordingly, although certain calls and transmissions are described herein with respect to the particular systems as depicted, in one or more embodiments, the various calls and transmissions may be made differently directed based on the differently distributed functionality. Further, additional components may be used, some combination of the functionality of any of the components may be combined.

Figure 2:
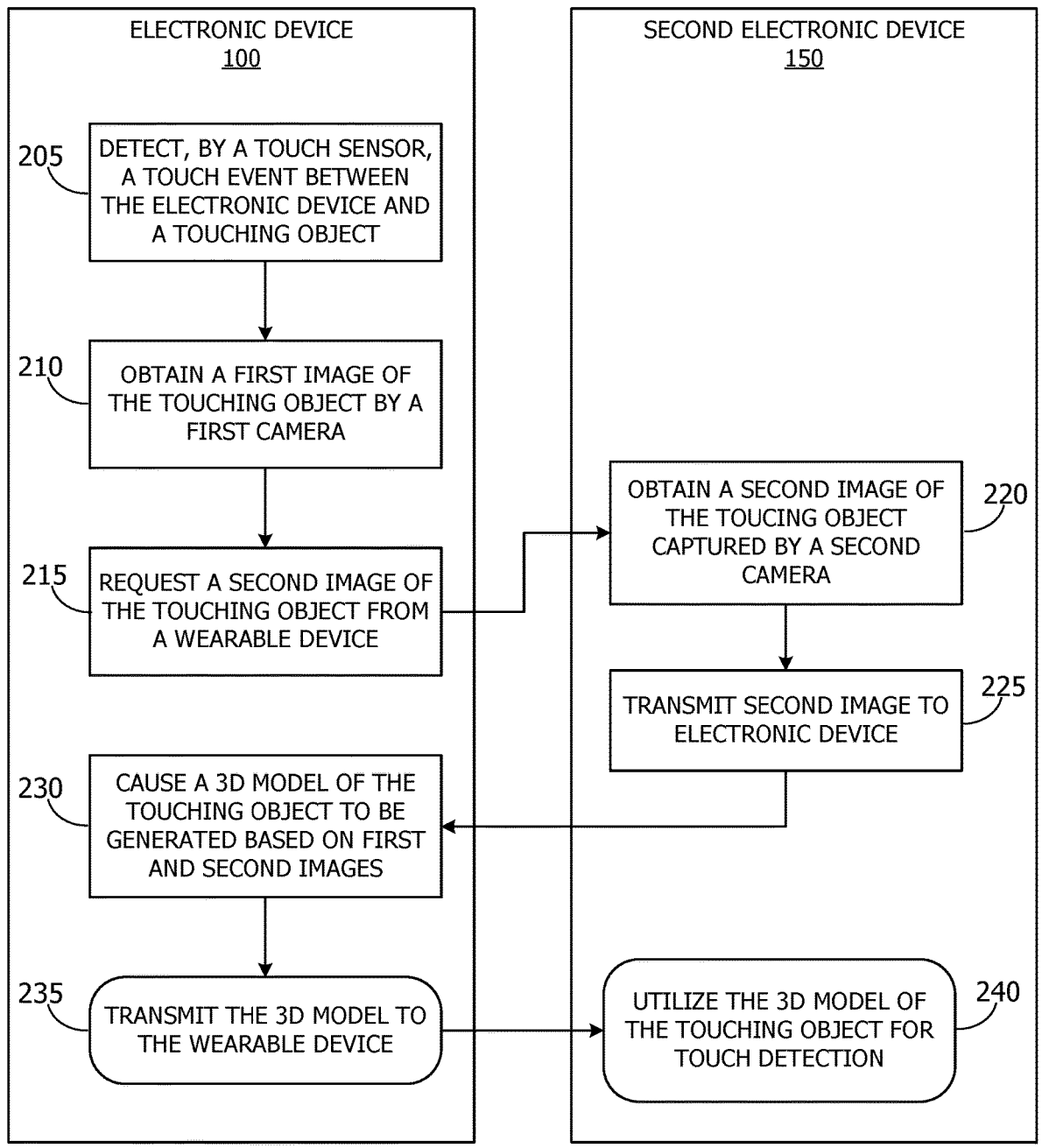
FIG. 2 shows, in flow chart form, an example technique for generating a 3D model of a touching object, according to one or more embodiments.

FIG. 2 shows, flow chart form, a method for generating a 3D model of a touching object in a physical environment. For purposes of explanation, the following steps will be described in the context of FIG. 1. However, it should be understood that the various actions may be taken by alternate components. In addition, the various actions may be performed in a different order. Further, some actions may be performed simultaneously, and some may not be required, or others may be added.

The flowchart begins at 205 where the electronic device 100 detects, by a touch sensor, a touch event between the electronic device and a touching object. In one or more embodiments, the touch sensor may be part of a touch display. The touch event may be detected in response to a detected touch by the touch sensor. The flowchart continues at 210, where the electronic device 100 obtains a first image of the touching object by a first camera. In one or more embodiments, the first image may include an RGB image, and RGBD image (e.g., a depth image), or the like. Further, according to one or more embodiments, depth information may be captured alternatively, or in addition to an RGB image.

At 215, the electronic device 100 requests a second image of the touching object from a second electronic device 150. According to one or more embodiments, the electronic device may transmit a request for a second image at a time that the touch event occurred. For example, transmitting the request may include the electronic device 100 transmitting a notification to second electronic device 150 that a touch event has occurred such that the touch image may be obtained by the second electronic device 150. Further, in one or more embodiments, the notification may include a time stamp by which the electronic device 100 and/or the second second electronic device 150 may determine a time at which depth or image data should be captured. In one or more embodiments, the electronic device 100 and the second electronic device 150 may be calibrated such that the timestamp is related to a consistent time across both devices.

The flowchart continues at 220, where the second electronic device 150 obtains a second image of the touching object captured by a second camera. In one or more embodiments, obtaining the second image may include obtaining data regarding the touching object during the touch event. In one or more embodiments, the data may include a second image, such as an RGB image, an RGBD image (e.g., a depth image), or the like. Further, according to one or more embodiments, depth information may be captured alternatively, or in addition to an RGB image. At 225, the second electronic device 150 transmits the second image to the electronic device.

The flowchart continues at 230, and the electronic device 100 causes a 3D model of the touching object to be generated based on the first and second images. According to one or more embodiments, the electronic device 100 may generate the 3D model, for example, by modeling module 135. Alternatively, the electronic device 100 may transmit instructions to an alternative system, such as a base station or other network device, to generate the model based on the first and second images and/or depth information from the electronic device 100 and the second electronic device 150. In one or more embodiments, the electronic device 100 may cause a preexisting 3D model, such as one sored in model store 145, to be updated based on the first image, second image, and/or depth information from the electronic device 100 and second electronic device 150. The electronic device 100 may save the generated or updated model to model store 145. Alternatively, or additionally, the electronic device 100 may cause the generated or updated model to be stored remotely, such as in network storage.

Optionally, the flowchart continues at 235 and the electronic device 100 transmits the 3D model to the second electronic device 150. In one or more embodiment, the second electronic device 150 may store the 3D model of the touching object locally, or may obtain the 3D model on demand from the model store 145. Then, at 240, the second electronic device 150 may utilize the 3D model of the touching object for vision-based touch detection.

According to one or more embodiments, the images from the electronic device 100 and second electronic device 150 may be used to provide a more accurate 3D representation of the touching object (such as a fingertip). In one or more embodiments, the fingertip may be a portion of the finger closes to the surface being touched. The 3D model generated may include, for example, a first segment of the finger (e.g., from the fingertip to the first knuckle), a first and second segment of the finger (e.g., from the fingertip to the second knuckle), or the like. In one or more embodiments, by using the 3D model generated from depth and/or image information captured from two different points of view, vision-based touch detection may be improved. For example, the tracking module 170 may better detect a touch when a touching portion of a touching object is occluded from the field of view of the camera 155 based on a visible portion of the touching object and the 3D model.

Figure 3:
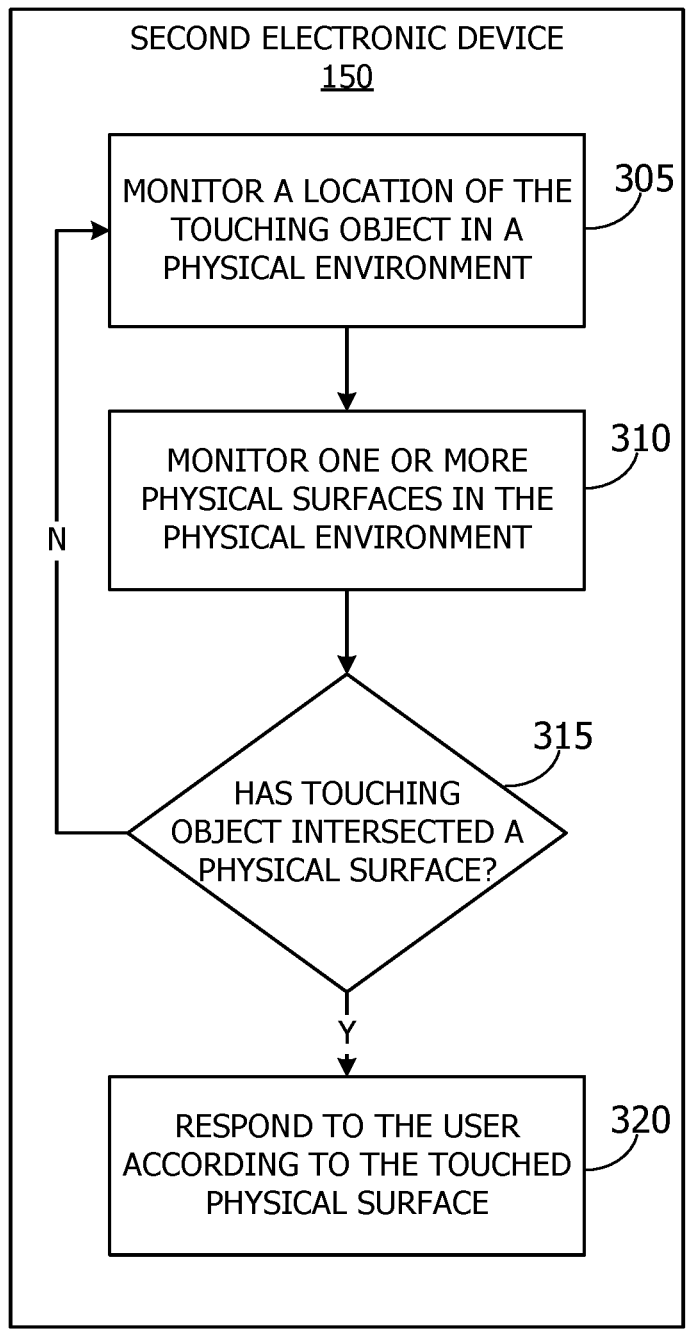
FIG. 3 shows, flow chart form, an example technique for utilizing a 3D model of a fingertip for visual touch detection, in accordance with one or more embodiments.

Referring now to FIG. 3, a flow chart showing a method for utilizing the vision-based touch detection, according to one or more embodiments. In one or more embodiments, the various actions take place utilizing the 3D model generated, for example, at 230 of FIG. 2. For purposes of explanation, the following steps will be described in the context of the various components described in FIG. 1. However, it should be understood that the various actions may be taken by alternate components. In addition, the various actions may be performed in a different order. Further, some actions may be performed simultaneously, and some may not be required, or others may be added.

The flowchart begins at 305, and the second electronic device 150 monitors a location of the touching object in a physical environment. According to one or more embodiments, the second electronic device 150 may monitor a location of surfaces in a physical environment. The flowchart also includes, at 310, the second electronic device 150 monitoring one or more physical surfaces in the physical environment. According to one or more embodiments, the location of the physical surface and the location of the touching object may be monitored in a common coordinate system, such as the coordinate system of the second electronic device 150. According to one or more embodiments, the second electronic device 150 may utilize a model of the environment to determine a location of the physical environment.

At 315, a determination is made regarding ether the touching object has intersected a physical surface. In one or more embodiments, whether the touching object has intersected the physical surface may be determined based on the relative locations of the physical surfaces in the physical environment, and the touching object. For example, if a touch point (e.g., an end of the touching object) is aligned such that it is abutting the plane of a physical surface, a touch event may be detected. If, at 315, a determination is made that the touching object has not intersected a physical surface, then the flowchart returns to 305 and the second electronic device 150 continues to monitor a location of the touching object in a physical environment.

Returning to 315, if a determination is made that the touching object has intersected a physical surface, then the flowchart continues at 320, and the second electronic device 150 responds to the user according to the touched physical surface. In one or more embodiments, the response may be presented by the second electronic device 150, for example, on display 175. As described above, second electronic device 150 may provide an interface for a virtual reality, augmented reality, and/or mixed reality system. In one or more embodiments, the physical touch in the physical environment by the user may elicit a virtual response, such as the generation and/or display of virtual information.

Figure 4:
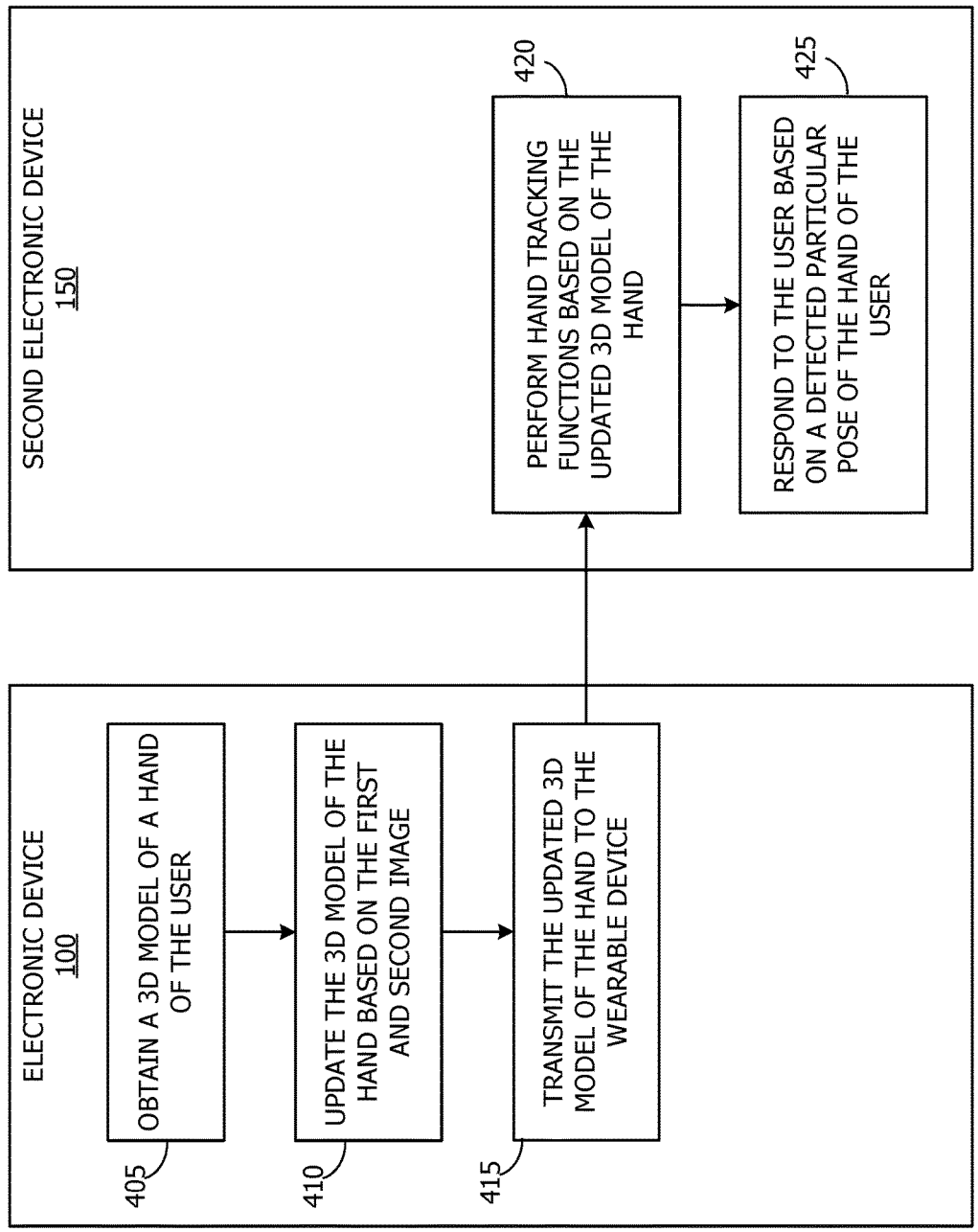
FIG. 4 shows, in flow chart form, an example technique for utilizing a 3D model of a fingertip for gesture recognition, according to one or more embodiments.

Referring now to FIG. 4, a flow chart showing a method for utilizing the 3D model to perform hand tracking functions, according to one or more embodiments. For purposes of explanation, the following steps will be described in the context of the various components described in FIG. 1. However, it should be understood that the various actions may be taken by alternate components. In addition, the various actions may be performed in a different order. Further, some actions may be performed simultaneously, and some may not be required, or others may be added.

The flowchart begins at 405, where the electronic device 100 obtains a 3D model of a hand of the user. According to one or more embodiments, the model store 145 may include a hand model corresponding to a hand of a user. The hand model may include 3D models of a hand corresponding to various poses of the hand.

The flowchart continues at 410, and the electronic device 100 updates the 3D model of the hand based on the first and second image. For example, a depth image may be obtained from a perspective such that a touch point between the touching object and the surface is occluded by the touching object (e.g., the fingertip touching a surface may be occluded by the hand from the point of view of the user). The model of the touching object may be generated or refined based on the combined data from the touch images and/or depth data. The additional information regarding the finger may be utilized to update or refine a 3D model of a hand that includes the finger. In one or more embodiments, ICP (iterative closet point) algorithms, contour alignment based algorithms or any algorithm based on mutual information could be used to fit the hand model or finger model with an image of the hand or finger to improve or enable hand tracking or touch detection.

At 415 the electronic device 100 transmits the updated 3D model of the hand to the second electronic device. In one or more embodiment, the second electronic device 150 may store the 3D model of the hand locally, or may obtain the 3D model of the hand on demand from the model store 145. The flowchart continues at 420, and the second electronic device 150 performs hand tracking functions based on the updated 3D model of the hand.

The flowchart concludes at 425, where the second electronic device 150 responds to the user based on a detected particular pose of the hand of the user. In one or more embodiments, a user may interact with a mixed reality environment based on particular gestures. In one or more embodiments, the use of a particular gesture in the physical environment by the user may elicit a virtual response, such as the generation and/or display of virtual information.

Figure 5:
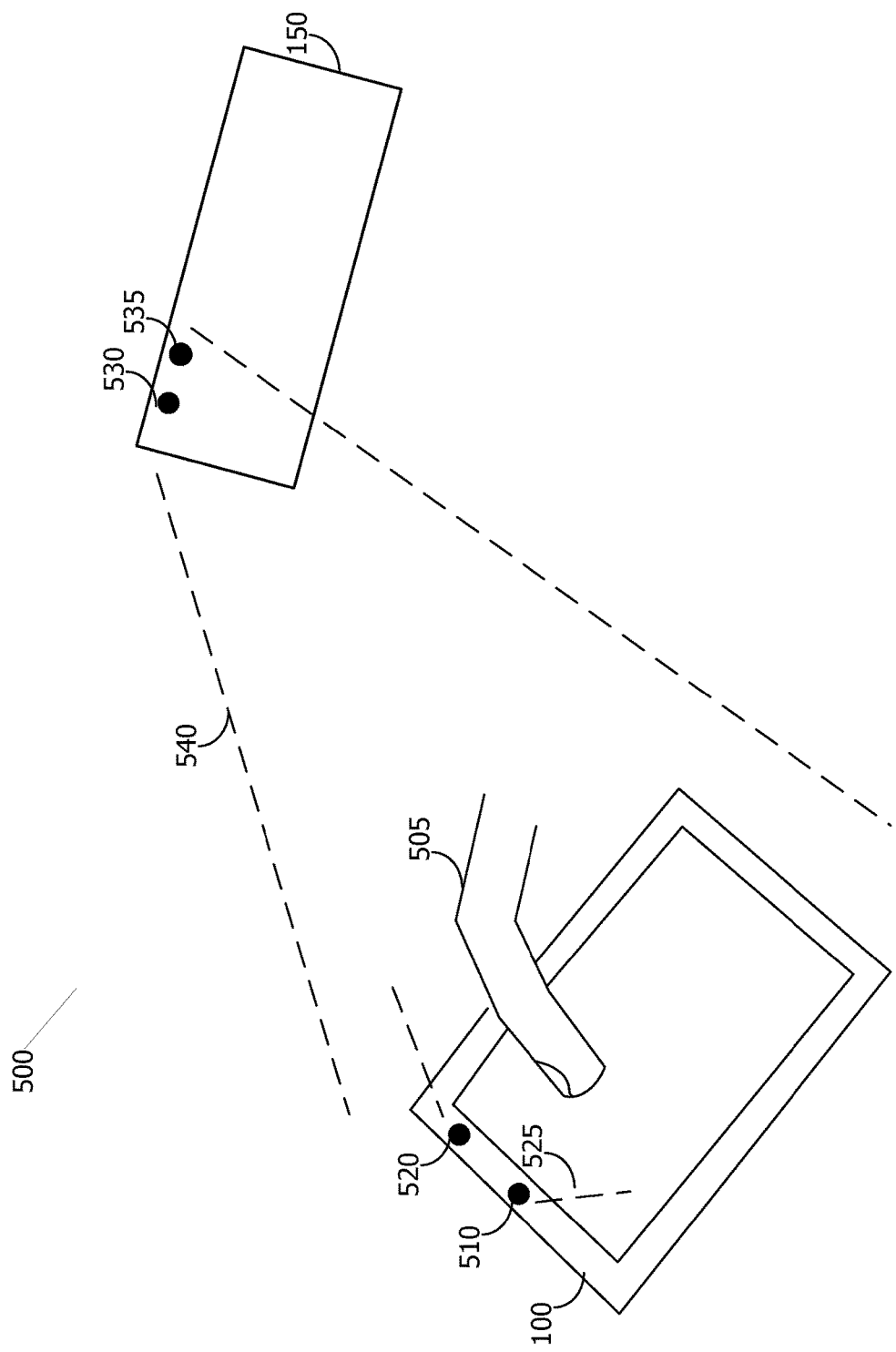
FIG. 5 shows an example system diagram illustrating a system setup for generating a 3D model of a fingertip, according to one or more embodiments.

Referring now to FIG. 5, a system diagram is shown for an example setup for generating a 3D model of a fingertip, according to one or more embodiments. FIG. 5 shows a fingertip of a user (e.g., a touching object) 505 utilizing an electronic device 100 that includes a front-facing camera system 510, and a depth sensor 520. In one or more embodiments, the field of view 525 of the camera 510 and depth sensor 520 may include the touching object 505 touching the electronic device 100.

In one or more embodiments, the second electronic device 150 may also include a camera system 530 and a depth sensor 520. In one or more embodiments, the field of view 540 of the camera 530 and depth sensor 540 may also include the touching object 505 touching the electronic device 100, from a different point of view than that of the front-facing camera system 510, and a depth sensor 520 of the electronic device 100.

Figure 6:
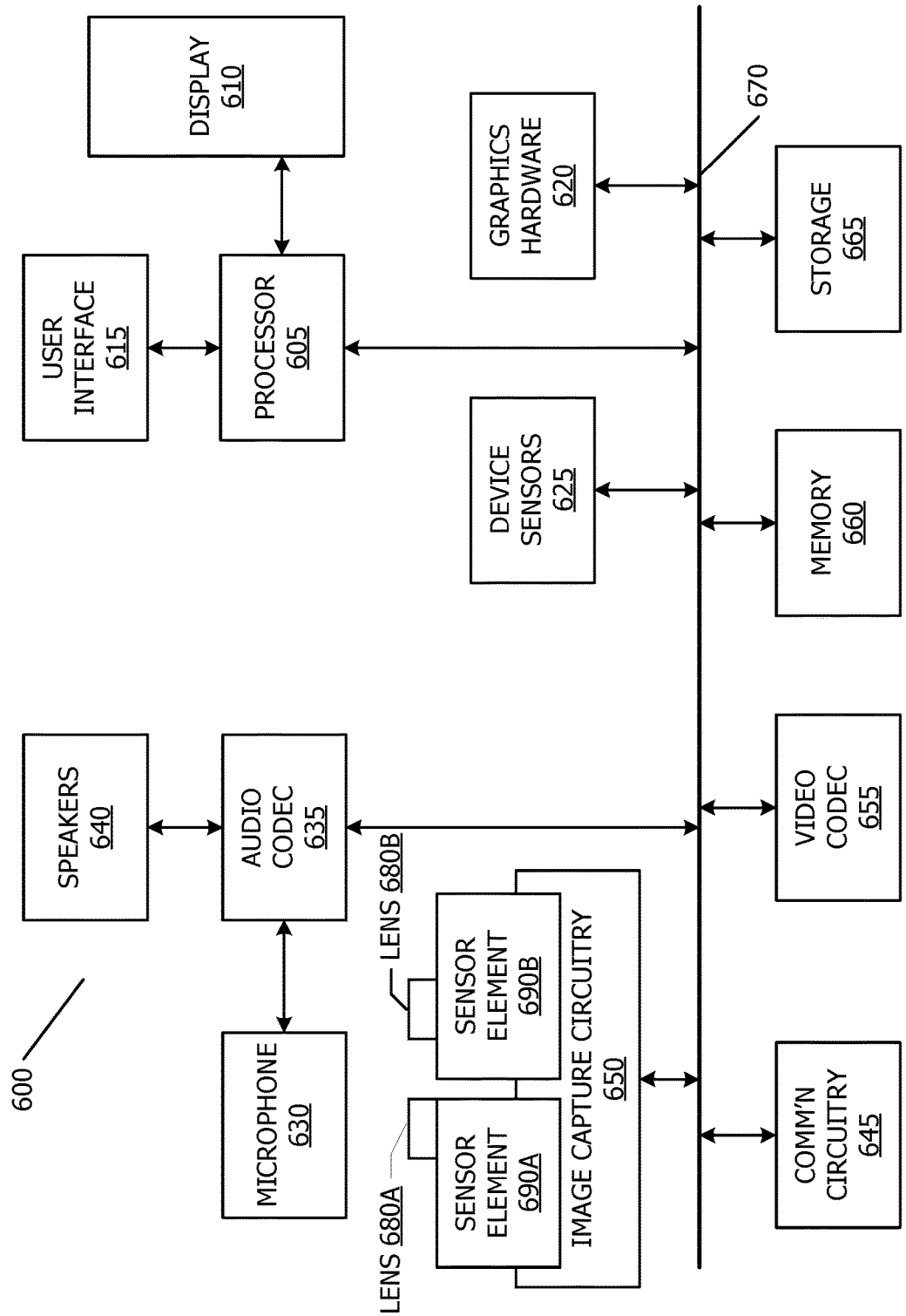
FIG. 6 shows, in block diagram form, a simplified multifunctional device according to one or more embodiments.

Referring now to FIG. 6, a simplified functional block diagram of illustrative multifunction device 600 is shown according to one embodiment. Multifunction electronic device 600 may include processor 605, display 610, user interface 615, graphics hardware 620, device sensors 625 (e.g., proximity sensor/ambient light sensor, accelerometer and/or gyroscope), microphone 630, audio codec(s) 635, speaker(s) 640, communications circuitry 645, digital image capture circuitry 650 (e.g., including camera system) video codec(s) 655 (e.g., in support of digital image capture unit), memory 660, storage device 665, and communications bus 670. Multifunction electronic device 600 may be, for example, a digital camera or a personal electronic device such as a personal digital assistant (PDA), personal music player, mobile telephone, or a tablet computer.

Processor 605 may execute instructions necessary to carry out or control the operation of many functions performed by device 600 (e.g., such as the generation and/or processing of images as disclosed herein). Processor 605 may, for instance, drive display 610 and receive user input from user interface 615. User interface 615 may allow a user to interact with device 600. For example, user interface 615 can take a variety of forms, such as a button, keypad, dial, a click wheel, keyboard, display screen and/or a touch screen. Processor 605 may also, for example, be a system-on-chip such as those found in mobile devices and include a dedicated graphics processing unit (GPU). Processor 605 may be based on reduced instruction-set computer (RISC) or complex instruction-set computer (CISC) architectures or any other suitable architecture and may include one or more processing cores. Graphics hardware 620 may be special purpose computational hardware for processing graphics and/or assisting processor 605 to process graphics information. In one embodiment, graphics hardware 620 may include a programmable GPU.

Image capture circuitry 650 may include two (or more) lens assemblies 680A and 680B, where each lens assembly may have a separate focal length. For example, lens assembly 680A may have a short focal length relative to the focal length of lens assembly 680B. Each lens assembly may have a separate associated sensor element 690. Alternatively, two or more lens assemblies may share a common sensor element. Image capture circuitry 650 may capture still and/or video images. Output from image capture circuitry 650 may be processed, at least in part, by video codec(s) 655 and/or processor 605 and/or graphics hardware 620, and/or a dedicated image processing unit or pipeline incorporated within circuitry 665. Images so captured may be stored in memory 660 and/or storage 665.

Sensor and camera circuitry 650 may capture still and video images that may be processed in accordance with this disclosure, at least in part, by video codec(s) 655 and/or processor 605 and/or graphics hardware 620, and/or a dedicated image processing unit incorporated within circuitry 650. Images so captured may be stored in memory 660 and/or storage 665. Memory 660 may include one or more different types of media used by processor 605 and graphics hardware 620 to perform device functions. For example, memory 660 may include memory cache, read-only memory (ROM), and/or random access memory (RAM).

Storage 665 may store media (e.g., audio, image and video files), computer program instructions or software, preference information, device profile information, and any other suitable data. Storage 665 may include one more non-transitory computer-readable storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 660 and storage 665 may be used to tangibly retain computer program instructions or code organized into one or more modules and written in any desired computer programming language. When executed by, for example, processor 605 such computer program code may implement one or more of the methods described herein.

According to one or more embodiments, camera-based transparent display may have numerous uses. For example, the techniques described above may be used for image stabilization. That is, a warping function utilized to warp the image may also be utilized to stabilize an image. In another embodiment, the camera-based transparent display may be used for machine learning. For example, a camera may capture images of a scene and classify the scene, and/or objects within the scene. In one or more embodiments, by tracking an object at which a user's eye is gazing, objects may be identified which should be classified.

In one or more embodiments, the camera-based transparent display may be used for presenting virtual information on the display, for example for augmented reality purposes. As an example, digital information associated with a particular location may be displayed in a more accurate location as perceived from a particular viewpoint through the display. As an example, an image of the scene may be enhanced by additional text or image data at a particular point within the scene in the warped image. In one or more embodiment, the digital information may be associated with a particular object in the scene. When the object falls within the warped image (or, when the object is visible in the display), then the digital information associated with the object may be displayed along with the object in the warped image. In one or embodiment, as the warped image changes, whether a change in the scene occurs, or a change in the warping occurs due to a change in location of the viewpoint or the device relative to the scene, the digital information may also change.

The scope of the disclosed subject matter should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory computer readable medium comprising computer readable code executable by one or more processors to:
obtain a model of a touching object;
detect, based on device sensor data of a first device, a touch event during a first time, wherein the touch event comprises a touch between the touching object and a target surface;
in response to the touch event:
obtain a first image of the touching object by a first camera of the first device at the first time;
obtain, from a second camera, a second image of the touching object, wherein the second image is captured at the first time;
update the model of the touching object based on at least one of the first image and the second image in accordance with the touch event; and
provide the updated model to a second device, wherein the second camera is comprised in the second device.

2. The non-transitory computer readable medium of claim 1,
wherein the updated model is usable by the second device for performing hand tracking.

3. The non-transitory computer readable medium of claim 1, further comprising computer readable code to:
capture first depth information for the touching object from a depth sensor of the first device,
wherein the computer readable code to update the model of the touching object further comprising computer readable code to update the model of the touching object based on the first depth information.

4. The non-transitory computer readable medium of claim 3, further comprising computer readable code to, in response to the touch event:
request second depth information for the touching object from a second device, wherein the second camera is comprised in the second device, and
wherein the computer readable code to update the model of the touching object further comprises computer readable code to update the model of the touching object based on the second depth information.

5. The non-transitory computer readable medium of claim 4, wherein at least one of the first depth information and second depth information is obtained from a perspective at which a touch point on a target surface is occluded by the touching object.

6. The non-transitory computer readable medium of claim 1, wherein the first image of the touching object captures a first view of the touching object, and wherein the second image of the touching object captures a second view of the touching object.

7. The non-transitory computer readable medium of claim 1, wherein the touching object comprises a hand of a user.

8. A method comprising:
obtaining a model of a touching object;
detecting, based on device sensor data of a first device, a touch event during a first time, wherein the touch event comprises a touch between the touching object and a target surface;
in response to the touch event:
obtaining a first image of the touching object by a first camera of the first device at the first time;
obtaining, from a second camera, a second image of the touching object, wherein the second image is captured at the first time;
updating the model of the touching object based on at least one of the first image and the second image in accordance with the touch event; and
providing the updated model to a second device, wherein the second camera is comprised in the second device.

9. The method of claim 8,
wherein the updated model is usable by the second device for performing hand tracking.

10. The method of claim 8, further comprising:
capturing first depth information for the touching object from a depth sensor of the first device,
wherein updating the model of the touching object further comprises updating the model of the touching object based on the first depth information.

11. The method of claim 10, further comprising, in response to the touch event:
requesting second depth information for the touching object from a second device, wherein the second camera is comprised in the second device, and
wherein updating the model of the touching object further comprises updating the model of the touching object based on the second depth information.

12. The method of claim 11, wherein at least one of the first depth information and second depth information is obtained from a perspective at which a touch point on a target surface is occluded by the touching object.

13. The method of claim 8, wherein the first image of the touching object captures a first view of the touching object, and wherein the second image of the touching object captures a second view of the touching object.

14. The method of claim 8, wherein the touching object comprises a hand of a user.

15. A system comprising:
one or more processors; and
one or more non-transitory computer readable media comprising computer readable code executable by the one or more processors to:
obtain a model of a touching object;
detect, based on device sensor data of a first device, a touch event during a first time, wherein the touch event comprises a touch between the touching object and a target surface;
in response to the touch event:
obtain a first image of the touching object by a first camera of the first device at the first time;
obtain, from a second camera, a second image of the touching object, wherein the second image is captured at the first time;
update the model of the touching object based on at least one of the first image and the second image in accordance with the touch event; and
provide the updated model to a second device, wherein the second camera is comprised in the second device.

16. The system of claim 15,
wherein the updated model is usable by the second device for performing hand tracking.

17. The system of claim 15, further comprising computer readable code to:
capture first depth information for the touching object from a depth sensor of the first device,
wherein the computer readable code to update the model of the touching object further comprising computer readable code to update the model of the touching object based on the first depth information.

18. The system of claim 17, further comprising computer readable code to, in response to the touch event:
- request second depth information for the touching object from a second device, wherein the second camera is comprised in the second device, and
- wherein the computer readable code to update the model of the touching object further comprises computer readable code to update the model of the touching object based on the second depth information.

19. The system of claim 18, wherein at least one of the first depth information and second depth information is obtained from a perspective at which a touch point on a target surface is occluded by the touching object.

20. The system of claim 15, wherein the first image of the touching object captures a first view of the touching object, and wherein the second image of the touching object captures a second view of the touching object.

\* \* \* \* \*